(12) United States Patent
Cho et al.

(10) Patent No.: US 8,750,229 B2
(45) Date of Patent: Jun. 10, 2014

(54) METHOD FOR DETERMINING A MODULATION AND CODING SCHEME IN A BROADBAND WIRELESS ACCESS SYSTEM

(75) Inventors: Hee Jeong Cho, Anyang-si (KR); Youngsoo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 13/380,746

(22) PCT Filed: Jun. 24, 2010

(86) PCT No.: PCT/KR2010/004120
§ 371 (c)(1),
(2), (4) Date: Dec. 23, 2011

(87) PCT Pub. No.: WO2010/151006
PCT Pub. Date: Dec. 29, 2010

(65) Prior Publication Data
US 2012/0099557 A1    Apr. 26, 2012

Related U.S. Application Data

(60) Provisional application No. 61/219,770, filed on Jun. 24, 2009.

(30) Foreign Application Priority Data

Jun. 24, 2010  (KR) .......................... 10-2010-0059957

(51) Int. Cl.
*H04W 72/04*     (2009.01)
(52) U.S. Cl.
USPC .......................................................... 370/329
(58) Field of Classification Search
CPC ........................... H04L 1/0003; H04L 1/0009
See application file for complete search history.

(56) References Cited

U.S. PATENT DOCUMENTS

| 2002/0118783 | A1* | 8/2002 | Cripps et al. | 375/347 |
| 2005/0208945 | A1* | 9/2005 | Hong et al. | 455/436 |
| 2007/0082621 | A1* | 4/2007 | Lee et al. | 455/69 |
| 2007/0098123 | A1* | 5/2007 | Hara | 375/347 |
| 2007/0105585 | A1* | 5/2007 | Lee et al. | 455/525 |
| 2007/0117518 | A1* | 5/2007 | Cai et al. | 455/67.13 |

(Continued)

FOREIGN PATENT DOCUMENTS

| KR | 10-2008-0041096 A | 5/2008 |
| KR | 10-2008-0073455 A | 8/2008 |

(Continued)

*Primary Examiner* — Asad Nawaz
*Assistant Examiner* — Parth Patel
(74) *Attorney, Agent, or Firm* — Birch, Stewart, Kolasch & Birch, LLP (57) ABSTRACT

The present invention relates to a broadband wireless access system, and more particularly, to a method in which a terminal determines a modulation and coding scheme (MCS) of uplink allocation information received from a base station under a condition such as that of a random access process in which both the terminal and the base station do not know each other's channel state. According to one exemplary embodiment of the present invention, a method of transmitting data comprises: receiving, from the base station, uplink allocation information for indicating an uplink resource for transmitting the specific data: determining a lowest modulation and coding scheme (MCS) to be applied to the specific data using information on the size and allocation size of the specific data; and transmitting to the base station via the uplink source, the specific data to which the determined MCS is applied.

8 Claims, 4 Drawing Sheets

(56) References Cited

U.S. PATENT DOCUMENTS

| | | | |
|---|---|---|---|
| 2008/0013505 A1* | 1/2008 | Trainin | 370/338 |
| 2008/0056193 A1* | 3/2008 | Bourlas et al. | 370/331 |
| 2008/0137582 A1* | 6/2008 | Kim et al. | 370/315 |
| 2009/0180413 A1* | 7/2009 | Sutton | 370/311 |
| 2009/0197590 A1* | 8/2009 | Borran et al. | 455/423 |
| 2010/0014500 A1 | 1/2010 | Lee et al. | |
| 2010/0023830 A1* | 1/2010 | Wengerter et al. | 714/748 |
| 2010/0246706 A1 | 9/2010 | Kim et al. | |
| 2011/0069786 A1* | 3/2011 | Sahara | 375/316 |
| 2011/0110444 A1* | 5/2011 | Roh et al. | 375/260 |
| 2012/0026965 A1* | 2/2012 | Cho et al. | 370/329 |
| 2012/0069813 A1* | 3/2012 | Cho et al. | 370/329 |
| 2013/0021960 A1* | 1/2013 | Lee et al. | 370/311 |

FOREIGN PATENT DOCUMENTS

| | | | | |
|---|---|---|---|---|
| KR | 2009038132 A * | 4/2009 | | H04I 27/26 |
| KR | 10-2009-0057833 A | 6/2009 | | |
| WO | WO2008/111809 A2 * | 9/2008 | | H04L 1/00 |

\* cited by examiner

| Allocation size | I MinimalSize | I SizeOffset | Idx | Burst size (bytes) | I SizeOffset | Idx | Burst size (bytes) |
|---|---|---|---|---|---|---|---|
| 1 | 1 | 0 | 1 | 6 | 1 | 2 | 8 |
| 2 | 1 | 0 | 1 | 6 | 1 | 2 | 8 |
| 3 | 1 | 0 | 1 | 6 | 1 | 2 | 8 |
| 4 | 2 | 0 | 2 | 8 | 1 | 3 | 9 |

Refer to Table 2, Refer to Table 3, Refer to Table 1

METHOD FOR DETERMINING A MODULATION AND CODING SCHEME IN A BROADBAND WIRELESS ACCESS SYSTEM

CROSS REFERENCE TO RELATED APPLICATIONS

This application is the National Phase of PCT/KR2010/004120 filed on Jun. 24, 2010, which claims priority under 35 U.S.C. 119(e) to U.S. Provisional Application No. 61/219,770 filed on Jun. 24, 2009 and under 35 U.S.C. 119(a) to Patent Application No. 10-2010-0059957 filed in the Republic of Korea on Jun. 24, 2010, all of which are hereby expressly incorporated by reference into the present application.

TECHNICAL FIELD

The present invention relates to a broadband wireless access system, and more particularly, to a method for determining a modulation and coding scheme of uplink allocation information received by a terminal from a base station in such a situation that the terminal and the base station are not aware of a channel status in-between like a random access procedure.

BACKGROUND ART

In a wireless communication system, a base station may allocate a radio resource of an uplink transmission to a terminal. In this case, the radio resource generally includes an uplink (UL) grant information form. And, this grant information may be transmitted to a terminal from a base station via a broadcast/unicast message or a control channel.

When a resource is allocated to a terminal, a base station is able to assign a modulation and coding scheme (hereinafter abbreviated MCS) and a multi-input multi-output (MIMO) scheme, which may differ in accordance with a current radio channel status of the terminal. This method may be called link adaptation. And, the link adaptation scheme may be able to raise spectral efficiency.

Yet, in order for a base station to guarantee a successful transmission despite having no information on a channel of a terminal, the base station may preferably assign a most reliable MCS to the terminal. As mentioned in the above description, a random access procedure can become one example that a base station allocates a resource to a terminal without having information on a channel of the terminal. If a resource is allocated to a terminal in an initial access procedure without information on a transmission power (Tx power) of the terminal, it may become another example of resource allocation.

In the following description, one example of an initial access procedure in IEEE 802.16m system is explained with reference to FIG. 1.

Figure 1:
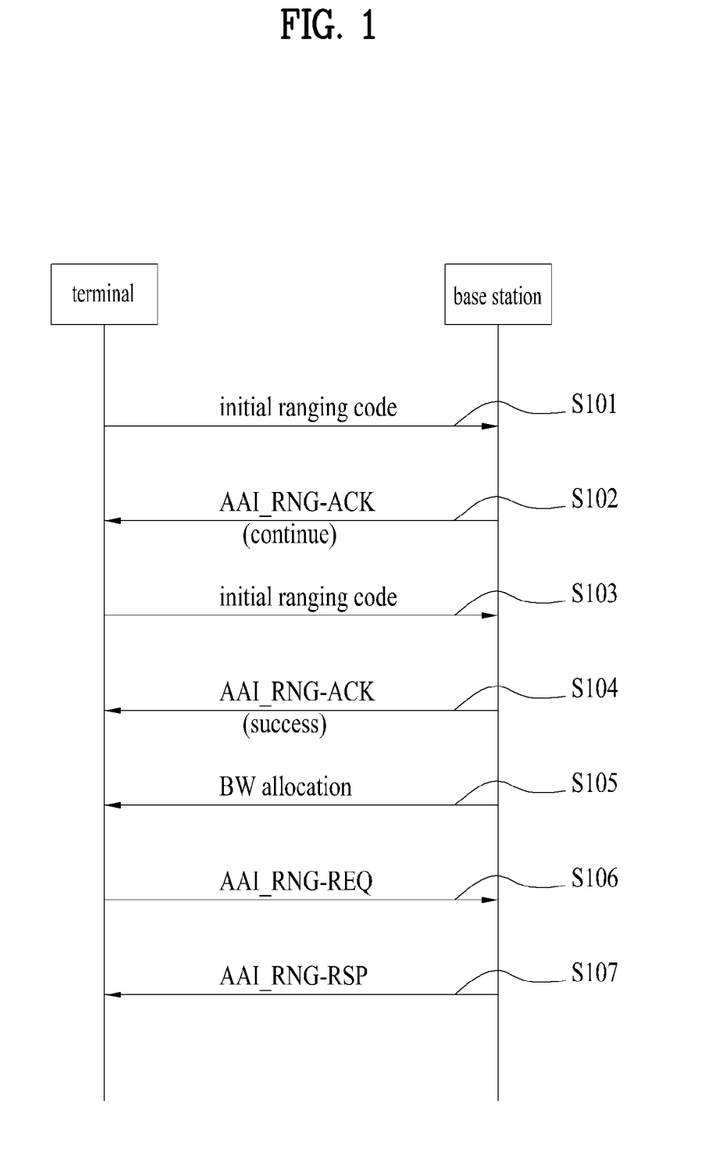
FIG. 1 shows one example of an initial access procedure in a general IEEE 802.16m system.

In FIG. 1, assume that a terminal (e.g., advanced mobile station: AMS) matches a downlink (DL) synchronization with a base station (ABS). And, assume that the terminal receives system information and then obtains random access region (or initial ranging region) information.

First of all, a terminal randomly selects one of initial ranging codes and may be then able to transmit the randomly selected initial ranging code to a random access region of a base station [S101].

The base station determines a received state of the corresponding code. If such a physical parameter as a timing and a transmission power needs to be modified, the base station sets a ranging status of a ranging acknowledgement (AAI_RNG-ACK) message to 'continue' and then sends the corresponding message to the terminal in a manner that a physical parameter compensation value is contained in the corresponding message [S102].

Subsequently, the terminal retransmits the initial ranging code to the base station by applying the physical parameter compensation value contained in the ranging acknowledgement (ACK) to the corresponding initial ranging code [S103].

If the retransmitted ranging code is normally received, the base station sets a ranging status of the ranging ACK message to 'success' and then transmits it to the terminal [S104].

Thereafter, in order for the terminal to send a ranging request (AAI_RNG-REQ) message, the base station is able to transmit allocation information on an uplink resource to the terminal [S105].

The terminal sends the ranging request message to the base station via the uplink resource indicated by the allocation information [S106]. In response to the ranging request message, the base station sends a ranging response (AAI_RNG-RSP) message [S107].

In this case, even if a channel status of a terminal is actually good, a base station allocates MCS (e.g., lowest MCS), which is as low as possible, to the terminal (S105 in case of FIG. 1), whereby resources may be wasted.

Yet, an allocation size of an uplink resource, which is allocated by a base station to enable a terminal to send a prescribed message to the base station, is variable. In accordance with this allocation size, MCS applied to a message to be sent via the corresponding resource is different. And, a lowest MCS may be different for each message. Since a lowest MCS may be set different for each base station, the base station should inform a terminal of a lowest MCS applied to each message. However, in the above-mentioned situation, if a terminal is informed of MCS each time, signaling overhead is increased. Hence, it is preferably necessary to define an efficient method for a terminal to determine a lowest MCS for transmitting a corresponding message.

DISCLOSURE OF THE INVENTION

Technical Tasks

An object of the present invention is to provide an efficient communication system and an efficient communication method.

Another object of the present invention is to provide a method for a terminal to efficiently determine a lowest MCS, which is to be applied to the terminal while a base station is not informed of a channel status of the terminal, and apparatus for the same.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a data transmitting method, in which a terminal transmits specific data to a base station in a situation that the base station is not aware of a channel status of the terminal, according to one embodiment of the present invention may include the steps of receiving uplink allocation information indicating an uplink resource for transmitting the specific data from the base station, determining a modulation and coding scheme (MCS) to be applied to the specific data using a size of the specific data and allocation size information, and transmitting the determined MCS applied specific data to the base station via the uplink resource, wherein the MCS includes a lowest MCS determined by the base station.

Preferably, if the situation is a random access procedure, the specific data may include a bandwidth request (BR) header or a bandwidth (BW) request message. Moreover, if the situation is an initial network entry procedure, the specific data may include a ranging request (AAI_RNG-REQ) message.

Preferably, a size of the allocation size information may be determined in accordance with a $1^{st}$ corresponding relation between a preset allocation size and a minimal size index.

More preferably, the determining step may be performed using the $1^{st}$ corresponding relation, a $2^{nd}$ corresponding relation between a preset size of the specific data and a burst size index and a $3^{rd}$ corresponding relation between a preset burst size offset ($I_{SizeOffset}$) and a modulation order.

More preferably, the allocation size information may be obtained by the terminal through one of a super frame header, a prescribed medium access control message and a MAP information element.

To further achieve these and other advantages and in accordance with the purpose of the present invention, a method of allocating an uplink resource, which is allocated for specific data to a terminal by a base station in a situation that the base station is not aware of a channel status of the terminal, according to one embodiment of the present invention may include the steps of transmitting uplink allocation information indicating the uplink resource for transmitting the specific data to the terminal by applying a modulation and coding scheme (MCS) to the specific data, transmitting allocation size information of the uplink resource to the terminal, and receiving the MCS applied specific data from the terminal via the uplink resource, wherein the MCS includes a lowest MCS determined by the base station.

Preferably, if the situation is a random access procedure, the specific data may include a bandwidth request (BR) header or a bandwidth (BW) request message. Moreover, if the situation is an initial network entry procedure, the specific data may include a ranging request (AAI_RNG-REQ) message.

Preferably, a size the allocation size information may be determined in accordance with a $1^{st}$ corresponding relation between a preset allocation size and a minimal size index.

More preferably, the terminal may determine the MCS using the $1^{st}$ corresponding relation, a $2^{nd}$ corresponding relation between a preset size of the specific data and a burst size index and a $3^{rd}$ corresponding relation between a preset burst size offset ($I_{SizeOffset}$) and a modulation order.

More preferably, the allocation size information transmitting step may be performed through one of a super frame header, a prescribed medium access control message and a MAP information element.

To further achieve these and other advantages and in accordance with the purpose of the present invention, a mobile terminal according to another embodiment of the present invention may include a processor and a radio (RF) communication module configured to transmit/receive a radio signal externally under the control of the controller, wherein the processor obtains uplink allocation information indicating an uplink resource for transmitting specific data from the base station in a situation that the base station is not aware of a channel status of the mobile terminal, determines a modulation and coding scheme (MCS) to be applied to the specific data using a size of the specific data and allocation size information, and controls the determined MCS applied specific data to be transmitted to the base station via the uplink resource and wherein the MCS includes a lowest MCS determined by the base station.

Preferably, if the situation is a random access procedure, the specific data may include a bandwidth request (BR) header or a bandwidth (BW) request message. Moreover, if the situation is an initial network entry procedure, the specific data may include a ranging request (AAI_RNG-REQ) message.

Preferably, a size of the allocation size information may be determined in accordance with a $1^{st}$ corresponding relation between a preset allocation size and a minimal size index.

More preferably, the processor may control the determination of the MCS to be performed using the $1^{st}$ corresponding relation, a $2^{nd}$ corresponding relation between a preset size of the specific data and a burst size index and a $3^{rd}$ corresponding relation between a preset burst size offset ($I_{SizeOffset}$) and a modulation order.

More preferably, the processor may control the allocation size information to be obtained through one of a super frame header, a prescribed medium access control message and a MAP information element.

Advantageous Effect

According to the schemes mentioned in the foregoing description, while a base is not informed of a channel status of a terminal, the terminal may be able to efficiently determine a lowest MCS to apply thereto. Therefore, the base station does not need to separately signal MCS to the terminal, thereby reducing a signaling overhead.

Effects obtainable from the present invention are non-limited by the above mentioned effect. And, other unmentioned effects can be clearly understood from the following description by those having ordinary skill in the technical field to which the present invention pertains.

MODE FOR INVENTION

In order to solve the above-mentioned technical tasks, the present invention proposes a method for a terminal to efficiently determine MCS of uplink grant information and apparatus for the same.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention may be modified. Some configurations or features of one embodiment can be included in another embodiment or can be substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. In this case, 'base station' may be replaced by such a terminology as a fixed station, a Node B, an eNode B (eNB), an access point (AP), an advanced BS (ABS) and the like. And, 'terminal' can be replaced by such a terminology as a user equipment (UE), a mobile station (MS), a mobile subscriber station (MSS), an advanced MS (AMS), a subscriber station (SS) and the like.

Embodiments of the present invention can be implemented using various means. For instance, embodiments of the present invention can be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

Embodiments of the present invention may be supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by at least one of P802.16-2004, P802.16e-2005, P802.16Rev2 and IEEE P802.16m documents, which are the standards of IEEE 802.16 system.

In the following description, specific terminologies may be provided to help the understanding of the present invention. And, the use of the specific terminology may be modified into another form within the scope of the technical idea of the present invention.

1$^{st}$ Embodiment

One embodiment of the present invention proposes a method of determining a lowest MCS of a message to be sent by a terminal via an allocation size.

In the following description, relations among parameters for determining an allocation size and a burst size index in IEEE 802.16m system are explained.

Table 1 shows relations among a burst size, a burst size index and a forward error correction (FEC) block size in a general IEEE 802.16m system.

TABLE 1

| idx | $N_{DB}$ (byte) | $K_{FB}$ |
|---|---|---|
| 1 | 6 | 1 |
| 2 | 8 | 1 |
| 3 | 9 | 1 |
| 4 | 10 | 1 |
| 5 | 11 | 1 |
| 6 | 12 | 1 |
| 7 | 13 | 1 |
| 8 | 15 | 1 |
| 9 | 17 | 1 |
| 10 | 19 | 1 |
| 11 | 22 | 1 |
| 12 | 25 | 1 |
| 13 | 27 | 1 |
| 14 | 31 | 1 |
| 15 | 36 | 1 |
| 16 | 40 | 1 |
| 17 | 44 | 1 |
| 18 | 50 | 1 |
| 19 | 57 | 1 |
| 20 | 64 | 1 |
| 21 | 71 | 1 |
| 22 | 80 | 1 |
| 23 | 90 | 1 |
| 24 | 100 | 1 |
| 25 | 114 | 1 |
| 26 | 128 | 1 |
| 27 | 144 | 1 |
| 28 | 164 | 1 |
| 29 | 180 | 1 |
| 30 | 204 | 1 |
| 31 | 232 | 1 |
| 32 | 264 | 1 |
| 33 | 296 | 1 |
| 34 | 328 | 1 |
| 35 | 368 | 1 |
| 36 | 416 | 1 |
| 37 | 472 | 1 |
| 38 | 528 | 1 |
| 39 | 600 | 1 |
| 40 | 656 | 2 |
| 41 | 736 | 2 |
| 42 | 832 | 2 |
| 43 | 944 | 2 |
| 44 | 1056 | 2 |
| 45 | 1200 | 2 |
| 46 | 1416 | 3 |
| 47 | 1584 | 3 |
| 48 | 1800 | 3 |
| 49 | 1888 | 4 |
| 50 | 2112 | 4 |
| 51 | 2400 | 4 |
| 52 | 2640 | 5 |
| 53 | 3000 | 5 |
| 54 | 3600 | 6 |
| 55 | 4200 | 7 |
| 56 | 4800 | 8 |
| 57 | 5400 | 9 |
| 58 | 6000 | 10 |
| 59 | 6600 | 11 |
| 60 | 7200 | 12 |
| 61 | 7800 | 13 |
| 62 | 8400 | 14 |
| 63 | 9600 | 16 |
| 64 | 10800 | 18 |
| 65 | 12000 | 20 |
| 66 | 14400 | 24 |

In Table 1, idx indicates an index of a burst size, $N_{DB}$ indicates a burst size, and $K_{FB}$ indicates a forward error correction (GEC) block size. In this case, the burst size may mean a data size to be transmitted before coding. In a physical (PHY) layer of IEEE 802.16m system, a burst size $N_{DB}$ corresponding to each index shown in Table 1 is supported only. This burst size corresponds to assize including a cyclic redundancy check (CRC).

The burst size may be calculated by Formula 1 as follows.

$$idx = I_{MinimalSize} + I_{SizeOffset} \quad \text{[Formula 1]}$$

In Formula 1, $I_{MinimalSize}$ indicates a minimal size index that counts an index per allocation size. $I_{SizeOffset}$ is a burst size offset and is related to a modulation order in a relation with an allocation size. In this case, the allocation size indicates the number of logical resource unit (LRU).

A relation between a minimal size index and an allocation size is shown in Table 2.

TABLE 2

| Allocation size | $I_{MinimalSize}$ | Allocation size | $I_{MinimalSize}$ | Allocation size | $I_{MinimalSize}$ |
|---|---|---|---|---|---|
| 1~3 | 1 | 16~18 | 15 | 58~64 | 26 |
| 4 | 2 | 19~20 | 16 | 65~72 | 27 |
| 5 | 4 | 21~22 | 17 | 73~82 | 28 |
| 6 | 6 | 23~25 | 18 | 83~90 | 29 |
| 7 | 8 | 26~28 | 19 | 91~102 | 30 |
| 8 | 9 | 29~32 | 20 | 103~116 | 31 |
| 9 | 10 | 33~35 | 21 | 117~131 | 32 |
| 10~11 | 11 | 36~40 | 22 | 132~145 | 33 |
| 12 | 12 | 41~45 | 23 | 146~164 | 34 |
| 13 | 13 | 46~50 | 24 | 165~184 | 35 |
| 14~15 | 14 | 51~57 | 25 | 185~192 | 36 |

Moreover, a relation between a burst size offset and a modulation order in accordance with an allocation size is shown in Table 3.

TABLE 3

| $I_{SizeOffset}$ | $N_{mod}$ (allocation size > 2) | $N_{mod}$ (allocation size = 2) | $N_{mod}$ (allocation size = 1) |
|---|---|---|---|
| 0~9 | 2 | 2 | 2 |
| 10~15 | 2 | 2 | 4 |
| 16~18 | 2 | 4 | 6 |
| 19~21 | 4 | 4 | 6 |
| 22~73 | 4 | 6 | 6 |
| 24~31 | 6 | 6 | 6 |

Figure 2:
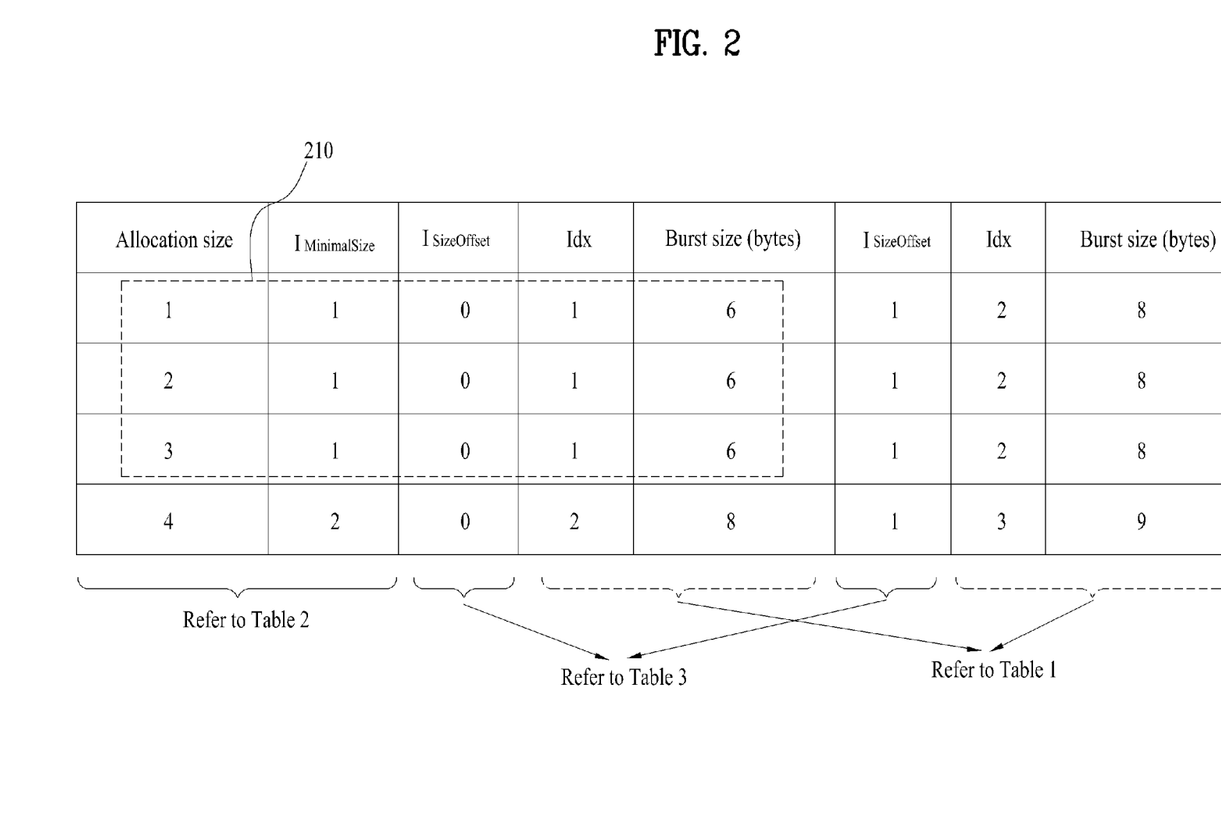
FIG. 2 is a diagram for relations among parameters for determining an allocation size and a burst size index in a general IEEE 802.16m system.

Referring to Table 1 to Table 3 synthetically, such a result shown in FIG. 2 can be drawn.

FIG. 2 is a diagram for relations among parameters for determining an allocation size and a burst size index in a general IEEE 802.16m system.

Referring to FIG. 2, relations among parameters for determining an allocation size and a burst size index are represented in association with Table 1 to Table 3. Eventually, it may be observed that MCS is determined by an allocation size, a burst size offset and a burst size. There is one specific burst size in one allocation size. If values of at least two of an allocation size, a burst size offset and a burst size are obtained, it may obtain a modulation order. Since the modulation order is obtained, it may be able to draw a coding rate using an allocation size for a burst size. Hence, it may be able to determine MCS.

For instance, when a burst size is 6 bytes (region 210), if an allocation size corresponds to 1 to 3, a minimal size index becomes 1 by Table 2. If a burst size is 6 bytes, Idx is 1. Hence, a size offset becomes 0. When the size offset is 0, a modulation order is 2 according to calculation through Table 3. Therefore, it may be able to calculate MCS for transmitting a corresponding burst size.

Resource allocation information for such a message, which is sent while a base station is not aware of a channel status of a terminal, as a ranging request message in an initial network entry procedure and a bandwidth request message (or a bandwidth request signaling header) in a random aces procedure is transmitted to the terminal via a specific MAP information element (A-MAP IE). For example, this MAP information element may include one of CMAL allocation MAP information element (CDMA Allocation A-MAP IE), bandwidth request acknowledgement MAP information element (BR ACK A-MAP IE) and the like. Yet, a maximal size (i.e., a burst size of a message itself except a header size and a CRC size) of each of the above-mentioned messages is previously determined for a corresponding usage in general.

For instance, a bandwidth request (BR) header may have a maximal size of 6 bytes. For another instance, although a type of a field included in a ranging request message differs in type for a usage, if the ranging request message is used for an initial network entry, when a required field like a message type, a hashed MAC address (AMSID*), a medium access control (MAC) version and the like are included, the ranging request message may have a maximal size of 8 bytes. If a ranging request message is used for a handover process, the ranging request message may include handover/security related fields (e.g., Ranging Purpose Indication, Serving BSID, STID, AK_COUNT, CMA Tuple, etc.) as well as a required field, the ranging request message may have a capacity of 23 bytes to the maximum.

Therefore, if a maximal size (i.e., a maximal burst size) of a message to be transmitted is determined in each situation and information on an allocation size (i.e., the number of LRU) is obtained, a terminal may be able to determine a lowest MCS, which is to be applied to a corresponding message, using the table shown in FIG. 2.

The present embodiment proposes methods for a base station to inform a terminal of a maximal allocation size of a corresponding message in order for the terminal to determine MCS to apply to a message which is to be sent in a specific situation.

In this case, the maximal allocation size of the corresponding message may indicate an allocation size corresponding to a maximal size the corresponding message can have in the situation of sending the corresponding message. Since the terminal is already ware of a size of the corresponding message, if the terminal obtains the maximal allocation size, the terminal may be able to determine a lowest MCS to apply to the corresponding message.

A method for indicating an allocation size for a bandwidth request message according to the present embodiment is described in the first place as follows.

1) Bandwidth Request Message

As mentioned in the foregoing description, a maximal size of a bandwidth request message becomes 6 bytes. If CRC having a size of 2 bytes is included, an allocation size may become one of 1 to 4 with reference to FIG. 2. Hence, in order for a base station to inform a terminal of an allocation size 1 to 4, at least 2 bits are required.

How to transmit 2-bit information indicating an allocation size to a terminal is described as follows.

First of all, a broadcast scheme may be usable.

For instance, it may be able to use a super frame header (SFH). In particular, it may be able to use a secondary super frame header sub-packet 3 (S-SFH SP3) including bandwidth request (BR) related parameters (e.g., BR Backoff start/end).

Secondly, a unicast scheme may be usable.

For instance, it may be able to use a medium access control (MAC) management message used for an initial entry process. In particular, information indicating an allocation size may be included in a ranging response (AAI_RNG-RSP) message, a basic capability response (AAI_SBC-RSP) message, a registration response (AAI_REG-RSP) message, a dynamic service addition response (AAI_DSA-RSP) message, a dynamic service change response (AAI_DSC-RSP) message or the like.

Thirdly, a multicast scheme may be usable.

For instance, allocation size information may be delivered via BR ACK A-MAPIE.

Using one of the above schemes, a base station may be able to inform a terminal of an allocation size to send a BR message. The terminal may be then able to determine and apply a lowest MCS of the corresponding BR message using the allocation size information delivered via one of the above-mentioned three schemes.

In the following description, a method of indicating an allocation size for a ranging request message according to the present embodiment is explained.

2) Ranging Request Message

As mentioned in the foregoing description, since a ranging request message includes a field different in accordance with a situation of its transmission, a size of the ranging request message may vary. For instance, in case of an initial network entry, a ranging request message may have a maximal size of 15 bytes (e.g., 2 byte-RRC, 2 byte header (GMH) and 3-byte extended header included). In a handover situation, a ranging request message may have a maximal size of 34 bytes (e.g., 2-byte RRC, 2-byte header and 3-byte extended header included). In this case, in order to indicate an allocation size of a ranging request message, 3 bits (i.e., allocation size corresponding to 1~8 by Table 1 to Table 3 like FIG. 2) are required for an initial network entry or 5 bits (i.e., allocation size corresponding to 1~18 by Table 1 to Table 3) are required for a handover situation.

First of all, a multicast scheme may be usable.

For instance, it may be able to use a super frame header (SFH). In particular, it may be able to use a secondary super frame header sub-packet 1 (S-SFH SP1) including initial/handover ranging related parameters (e.g., ranging codes, ranging region, etc.).

Secondly, a multicast scheme may be available.

In particular, it may be able to transmit information (i.e., allocation size) for a terminal to determine a lowest MCS of a message to transmit using such a multicast message as a ranging acknowledgement (AAI_RNG-ACK) message.

A base station may be able to inform a terminal of an allocation size to transmit a ranging request message by one of the above-mentioned methods. Subsequently, the terminal may be able to determine and apply a lowest MCS of a ranging request message using the delivered allocation size information.

By the aforesaid method for a base station to inform a terminal of an allocation size to enable the terminal to determine a lowest MCS according to one embodiment of the present invention, it may be unnecessary for the base station to transmit MCS or ISizeOffset value of a message to be transmitted each time by the terminal. Therefore, it may bring an effect that signaling overhead is reduced. Yet, although a maximal size of a message, which is transmitted to a base station by a terminal in each situation, needs to be fixed according to the present embodiment, a detailed size (i.e., a burst size in accordance with parameters included/excluded in/from a message for each usage) of a message described in this specification is just exemplary and may vary according to a corresponding system.

$2^{nd}$ Embodiment

Meanwhile, according to another embodiment of the present invention, a terminal may be able to determine a minimal MCS based on an MCS applied to a secondary super frame header of a corresponding cell.

In particular, when a terminal performs an initial entry into a network, the terminal is not aware of such information on a cell status as a cell type, a radius, an interference level and the like. In case of IEEE 802.16m system, a base station transmits a super frame header by a prescribed MCS. In this case, the super frame header may be divided into a primary super frame header (P-SFH) and a secondary super frame header (S-SFH). And, control information of the S-SFH may be carried on the P-SFH. In this case, an MCS of the P-SFH is fixed and an MCS of the S-SFH is carried on the P-SFH. Hence, if the MCS of the S-SFH is changed, a base station transmits the changed MCS information via the P-SFH. Using this, the present embodiment proposes that a terminal may determine a lowest MCS of a message to transmit using MCS applied to S-SFH.

In order for a terminal to determine a lowest MCS of a message to transmit using MCS applied to S-SFH, a corresponding relation between the MCS of the S-SFH and the lowest MCS may be preferably determined in advance. Preferably, information indicating this corresponding relation is shared between a terminal and a base station in advance or may be signaled to a terminal by a base station. In case that a base station signals information indicating an MCS corresponding relation to a terminal, it may be able to inform the terminal of the whole corresponding relation. Alternatively, a following method may be usable. First of all, a plurality of corresponding relations are determined, indexes are given to a plurality of the corresponding relations, respectively, and the indexes are then signaled only. In this case, a plurality of the corresponding relations are preferably shared between a terminal and a base station in advance.

In the following description, a process for a terminal to determine a lowest MCS for a transmission of BR header is explained with reference to FIG. 3.

Figure 3:
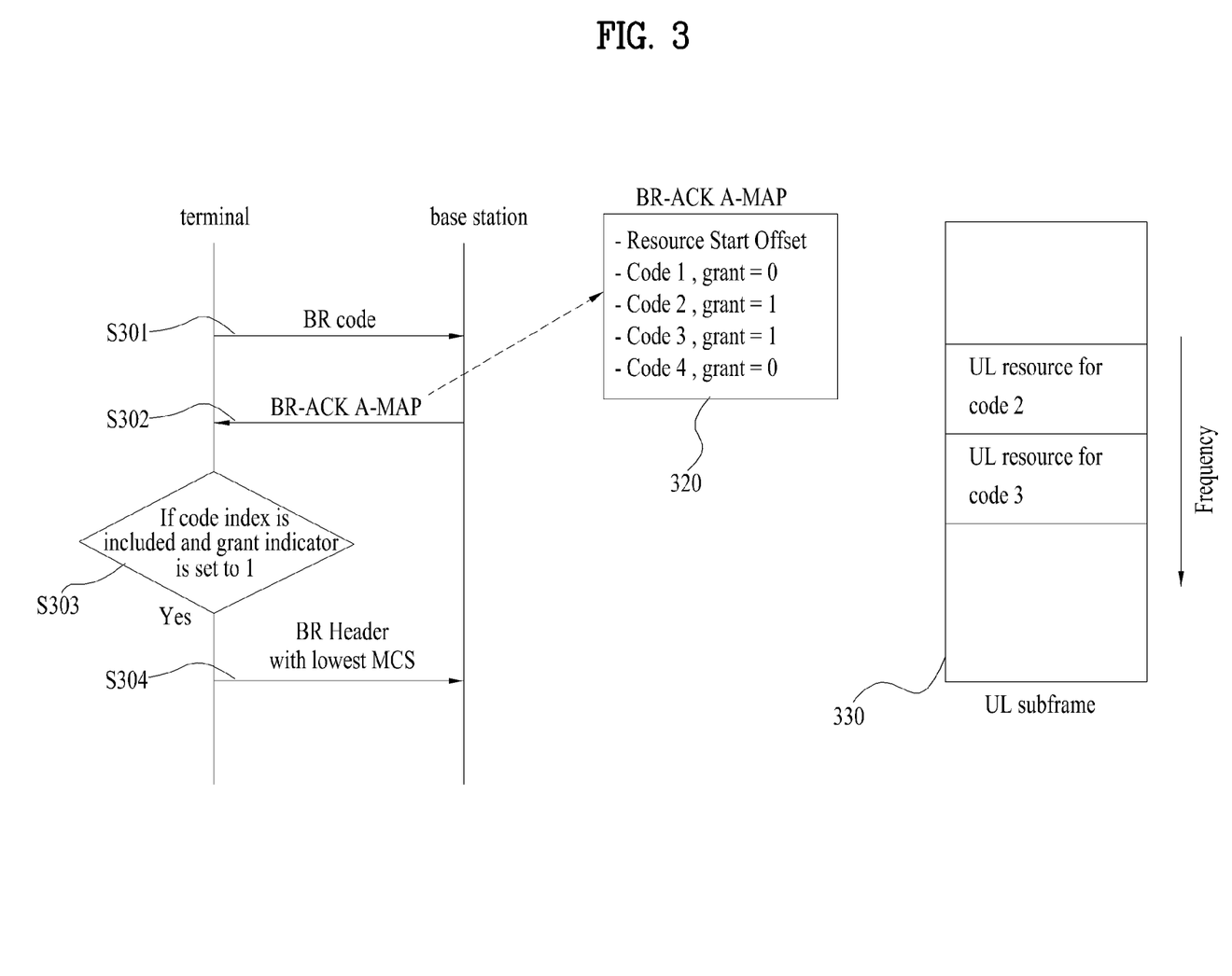
FIG. 3 shows one example of a method for a terminal to determine MCS according to one embodiment of the present invention.

FIG. 3 shows one example of a method for a terminal to determine MCS according to another embodiment of the present invention.

Referring to FIG. 3, in order to make a bandwidth request to a base station, a terminal may be able to transmit a bandwidth request (BR) code to the base station [S301].

The base station may be able to broadcast a reception result of the bandwidth request code via a bandwidth request acknowledgement MAP (BR-ACK A-MAP IE) [S302].

Information 320 included in the bandwidth request acknowledgement MAP (BR-ACK A-MAP IE) may include resource start offset information indicating a start of a region for allocating a bandwidth received from a terminal in an uplink subframe 330 and grant indicator information indicating a presence or non-presence of a grant (uplink resource allocation) corresponding to each code.

If a grant indicator is set to 0, an uplink resource for a corresponding code is not included in the uplink subframe 330 for transmitting MAP (i.e., not allocated by a base station). In case of a code having a grant indicator set to 1, uplink resource is allocated in order. For this, referring to FIG. 3, a grant indicator for Code 2 or Code 3 is 1 and resource for a corresponding code is allocated in order after a resource start offset in the uplink subframe 330. In this case, a size of a resource allocated to a terminal by a base station may preferably become a size enough for the terminal to transmit a bandwidth request header by a minimal MCS.

Consequently, the terminal may be aware that a code transmitted by the terminal is included in BR-ACK A-MAP IE. And, the terminal may be aware that an uplink resource is allocated to the terminal if a grant indicator for a corresponding code is 1. And, the terminal may be able to determine a location of the uplink resource as well [S303].

The terminal may be able to transmit a bandwidth request header having a minimal MCS applied thereto to the base station via the resource allocated to the terminal [S304].

In this case, as mentioned in the foregoing description, the terminal may be able to determine an MCS, which is to be applied to the bandwidth request header, using an MCS applied to S-SFH.

In this case, a corresponding relation between the MCS of the S-SFH and the minimal MCS applied to the information transmitted to the base station by the terminal may have the following format shown in Table 4.

TABLE 4

| MCS (S-SFH) | MCS (lowest) |
|---|---|
| QPSK 1/16 | QPSK 1/8 |
| QPSK 1/12 | QPSK 1/6 |
| QPSK 1/8 | QPSK 1/4 |
| QPSK 1/6 | QPSK 1/2 |

Table 4 shows a format in which a minimal MCS of a terminal is set by a structure of 1-to-1 correspondence to an MCS of an S-SFH. Hence, a terminal obtains an MCS applied to an S-SFH of a corresponding cell via a P-PSFH and may be then able to determine a lowest MCS of a message or header to transmit in a manner of comparing the obtained MCS of the S-SFH with such a corresponding relation table as Table 4. For instance, if MCS of S-SFH is QPSK 1/8, a terminal is able to know that a lowest MCS of a message or header to be transmitted by the terminal is QPSK 1.4 and a base station is also aware of a corresponding relation of MCS. Hence, an uplink resource allocated by the base station becomes an amount enough for the terminal to transmit the corresponding message or header by a lowest MCS.

Meanwhile, a corresponding relation between an MCS of an S-SFH and an MCS applied to a message or header to be transmitted by a terminal can be represented as a corresponding relation between an allocation size (or number of LRUs allocated) and $I_{SizeOffset}$, as shown in Table 5.

TABLE 5

| MCS (S-SFH) | Number of LRUs allocated | I_sizeoffset |
|---|---|---|
| QPSK 1/16 | 4 | 0 |
| QPSK 1/12 | 3 | 1 |
| QPSK 1/8 | 2 | 1 |
| QPSK 1/6 | 1 | 1 |

Therefore, a terminal may be able to know an allocation size allotted to the terminal and $I_{SizeOffset}$ by MCS applied to S-SFH of a base station using such a corresponding relation shown in Table 5. And, the terminal may be able to determine a lowest MCS using the corresponding relation shown in one of Table 1 to Table 3 or the corresponding relation shown in FIG. 2.

Structures of Terminal and Base Station

In the following description, a terminal and a base station (FBS, MBS), in which embodiments of the present invention may be implemented, according to another embodiment of the present invention are explained.

First of all, a terminal may work as a transmitter in uplink or a receiver in downlink. A base station may work as a receiver in uplink or a transmitter in downlink. In particular, each of the terminal and the base station may include a transmitter and a receiver for transmission of information and/or data.

Each of the transmitter and the receiver may include a processor, a module, a part and/pr a means for performing embodiments of the present invention. In particular, each of the transmitter and the receiver may include a module (means) for encrypting a message, a module for interpreting the encrypted message, an antenna for transceiving the message and the like. Examples of the transmitter and receiver are explained with reference to FIG. 4 as follows.

Figure 4:
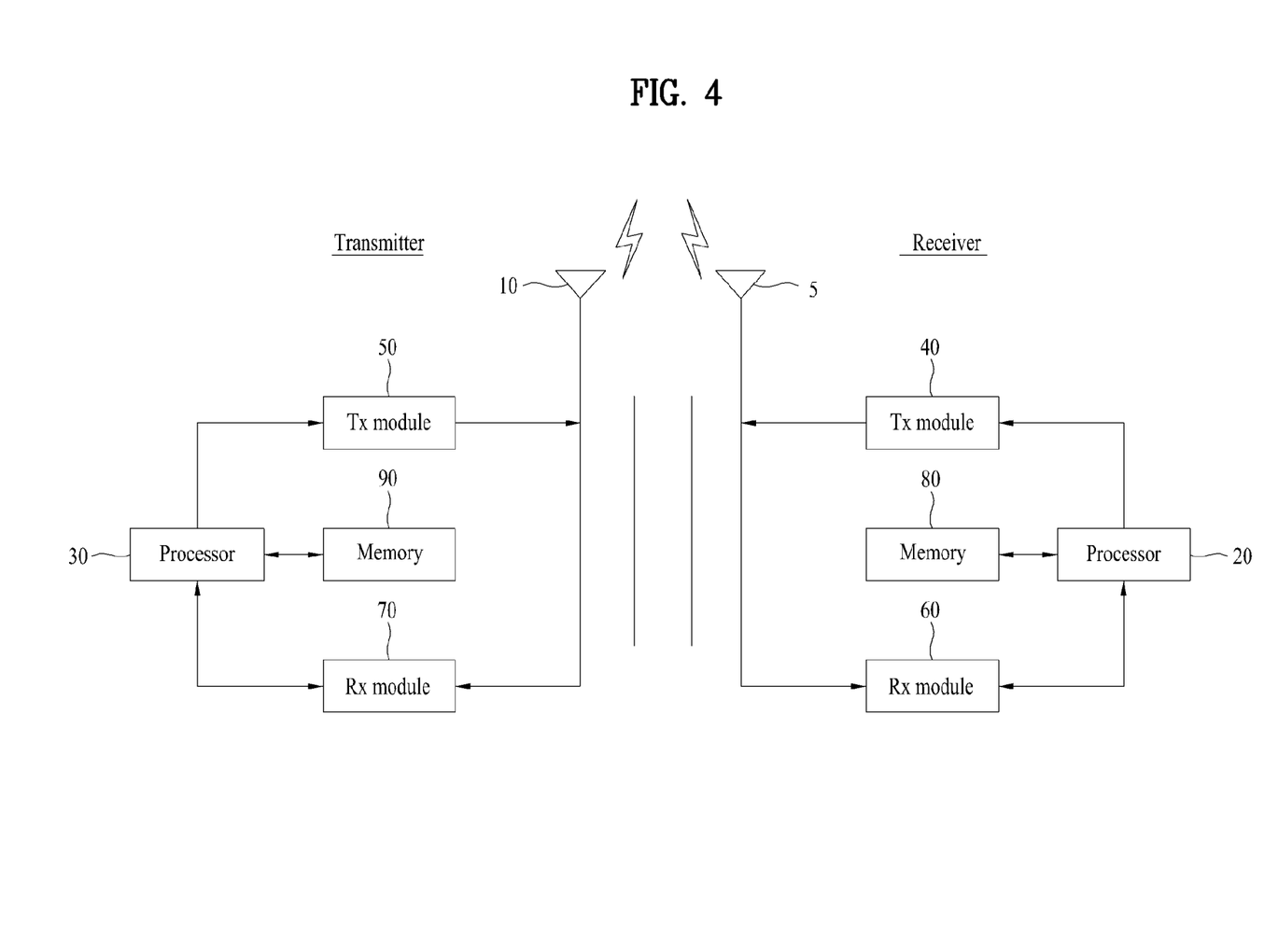
FIG. 4 is a block diagram for one example of structures of a transmitter and a receiver according to another embodiment of the present invention.

FIG. 4 is a block diagram for one example of structures of a transmitter and a receiver according to another embodiment of the present invention.

Referring to FIG. 4, a left part shows a structure of a transmitter and a right part shows a structure of a receiver. The transmitter/receiver may include an antenna 5/10, a processor 20/30, a transmitting (Tx) module 40/50, a receiving (Rx) module 60/70 and a memory 80/90. Each of the components may perform a corresponding function. The components are described in detail as follows.

First of all, the antenna 5/10 externally transmits a signal generated from the transmitting module 40/50. And, the antenna 50/10 receives a radio signal from outside and then delivers the received radio signal to the receiving module 60/70. In case that a multiple-antenna (MIMO) function is supported, at least two antennas may be provided.

The antenna, the transmitting module and the receiving module may be combined together to configure a radio communication (RF) module.

The processor 20/30 generally controls overall operations of the mobile/base station. For example, the processor 20/30 may be able to perform a controller function for performing the above-described embodiments of the present invention, a MAC (medium access control) frame variable control function according to service characteristics and propagation environment, a handover function, an authentication function, an encryption function and the like. In particular, the processor 20/20 may be able to perform overall controls to execute the random access procedure mentioned in the foregoing description.

Specifically, while a base station is not aware of a channel status of a terminal like a random access procedure or an initial network entry procedure, when a processor of a mobile terminal transmits a message or header to the base station, the processor of the mobile terminal may be able to determine a lowest MCS applied to the transmission. In order to determine the lowest MCS, the processor of the mobile terminal may be able to use information indicating an allocation size transmitted from the base station or an MCS applied to S-SFH of the base station. Having determined the lowest MCS, the terminal may be able to control the message or header to be transmitted to the base station by applying the lowest MCS to the message or header through a resource allocated by the base station.

Besides, the processor of the mobile terminal may be able to perform overall control operations of the operating processes mentioned in the foregoing description.

The transmitting module 40/50 performs prescribed coding and modulation on data, which is scheduled by the processor 20/30 and will be then transmitted externally, and may be then able to deliver the coded and modulated data to the antenna 5/10.

The receiving module 60/70 reconstructs the radio signal received externally via the antenna 5/10 into original data in a manner of performing decoding and demodulation on the received radio signal and may be then able to deliver the reconstructed original data to the processor 20/30.

The memory 80/90 can store programs for processing and control of the processor 20/30 and may be able to perform a function of temporarily storing input/output data. And, the memory 80/90 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

The base station may already or further include means, modules, parts and/or the like for performing a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and propagation environment, a fast traffic real-time control function, a handover function, an authentication and encryption function, a packet modulation/demodulation function for data transmission, a fast packet channel coding function, a real-time modem control function, and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention is applicable to various wireless access systems. And, 3GPP ($3^{rd}$ generation partnership project), 3GPP2 and/or IEEE 802.xx (institute of electrical and electronic engineers 802) system and the like are examples for the various wireless access systems. Embodiments of the present invention are applicable to all technical fields having the various wireless access systems applied thereto as well as the various wireless access systems.

What is claimed is:

1. A method for transmitting a ranging request message during a ranging procedure by a mobile terminal in a situation that a base station is not aware of a channel status of the mobile terminal, the method comprising:

receiving an allocation size corresponding to the ranging request message from the base station, wherein the allocation size indicates a number of LRUs (Logical Resource Units);

determining a modulation and coding scheme (MCS) of the ranging request message using a maximum size of the ranging request message and the allocation size, wherein the maximum size of the ranging request message is determined depending on a purpose of the ranging procedure, wherein the step of determining the MCS comprises:

selecting a first index mapped to the maximum size of the ranging request message and a second index mapped to the allocation size; and determining the MCS using a third index obtaining by subtracting the second index from the first index; and transmitting the determined MCS applied ranging request message to the base station, wherein the purpose of the ranging procedure comprises a handover process or an initial network entry, wherein the first index is selected from Table A, shown below, using the size of the request message:

TABLE A

| idx | $N_{DB}$ (byte) | $K_{FB}$ |
|---|---|---|
| 1 | 6 | 1 |
| 2 | 8 | 1 |
| 3 | 9 | 1 |
| 4 | 10 | 1 |
| 5 | 11 | 1 |
| 6 | 12 | 1 |
| 7 | 13 | 1 |
| 8 | 15 | 1 |
| 9 | 17 | 1 |
| 10 | 19 | 1 |
| 11 | 22 | 1 |
| 12 | 25 | 1 |
| 13 | 27 | 1 |
| 14 | 31 | 1 |
| 15 | 36 | 1 |
| 16 | 40 | 1 |
| 17 | 44 | 1 |
| 18 | 50 | 1 |
| 19 | 57 | 1 |
| 20 | 64 | 1 |
| 21 | 71 | 1 |
| 22 | 80 | 1 |
| 23 | 90 | 1 |
| 24 | 100 | 1 |
| 25 | 114 | 1 |
| 26 | 128 | 1 |
| 27 | 144 | 1 |
| 28 | 164 | 1 |
| 29 | 180 | 1 |
| 30 | 204 | 1 |
| 31 | 232 | 1 |
| 32 | 264 | 1 |
| 33 | 296 | 1 |
| 34 | 328 | 1 |
| 35 | 368 | 1 |
| 36 | 416 | 1 |
| 37 | 472 | 1 |
| 38 | 528 | 1 |
| 39 | 600 | 1 |
| 40 | 656 | 2 |
| 41 | 736 | 2 |
| 42 | 832 | 2 |

TABLE A-continued

| idx | $N_{DB}$ (byte) | $K_{FB}$ |
|---|---|---|
| 43 | 944 | 2 |
| 44 | 1056 | 2 |
| 45 | 1200 | 2 |
| 46 | 1416 | 3 |
| 47 | 1584 | 3 |
| 48 | 1800 | 3 |
| 49 | 1888 | 4 |
| 50 | 2112 | 4 |
| 51 | 2400 | 4 |
| 52 | 2640 | 5 |
| 53 | 3000 | 5 |
| 54 | 3600 | 6 |
| 55 | 4200 | 7 |
| 56 | 4800 | 8 |
| 57 | 5400 | 9 |
| 58 | 6000 | 10 |
| 59 | 6600 | 11 |
| 60 | 7200 | 12 |
| 61 | 7800 | 13 |
| 62 | 8400 | 14 |
| 63 | 9600 | 16 |
| 64 | 10800 | 18 |
| 65 | 12000 | 20 |
| 66 | 14400 | 24 | and wherein "idx" re resents the first index and "$N_{DB}$" represents the maximum size of the ranging request message.

2. The method of claim 1, wherein if the purpose of the ranging procedure is the handover process, the maximum size of the ranging request message is eight bytes, and
wherein if the purpose of the ranging procedure is the initial network entry, the maximum size of the ranging request message is 15 bytes.

3. The method of claim 1, wherein the second index is selected from Table B, shown below, using the allocation size received from the BS and the MCS is determined using Table C, shown below, using the third index:

TABLE B

| Allocation size | $I_{MinimalSize}$ |
|---|---|
| 1~3 | 1 |
| 4 | 2 |
| 5 | 4 |
| 6 | 6 |
| 7 | 8 |
| 8 | 9 |
| 9 | 10 |
| 10~11 | 11 |
| 12 | 12 |
| 13 | 13 |
| 14~15 | 14 |
| 16~18 | 15 |
| 19~20 | 16 |
| 21~22 | 17 |
| 23~25 | 18 |
| 26~28 | 19 |
| 29~32 | 20 |
| 33~35 | 21 |
| 36~40 | 22 |
| 41~45 | 23 |
| 46~50 | 24 |
| 51~57 | 25 |
| 58~64 | 26 |
| 65~72 | 27 |
| 73~82 | 28 |
| 83~90 | 29 |
| 91~102 | 30 |
| 103~116 | 31 |
| 117~131 | 32 |

TABLE B-continued

| Allocation size | $I_{MinimalSize}$ |
|---|---|
| 132~145 | 33 |
| 146~164 | 34 |
| 165~184 | 35 |
| 185~192 | 36 |

TABLE C

| $I_{SizeOffset}$ | $N_{mod}$ (allocation size > 2) | $N_{mod}$ (allocation size = 2) | $N_{mod}$ (allocation size = 1) |
|---|---|---|---|
| 0~9 | 2 | 2 | 2 |
| 10~15 | 2 | 2 | 4 |
| 16~18 | 2 | 4 | 6 |
| 19~21 | 4 | 4 | 6 |
| 22~23 | 4 | 6 | 6 |
| 24~31 | 6 | 6 | 6 | wherein "$I_{MinimalSize}$" represents the second index, "$I_{SizeOffset}$" represents the third index and "$N_{mod}$" represents a modulation order according to the MCS.

4. The method of claim 1, wherein the allocation size is obtained by the mobile terminal through one of a super frame header, a prescribed medium access control message and a MAP information element.

5. A mobile terminal comprising:
a processor; and
a radio (RF) communication module configured to transmit/receive a radio signal,
wherein the processor is configured to:
    receive an allocation size corresponding to the ranging request message from a base station, the allocation size indicating a number of LRUs (Logical Resource Units),
    determine a modulation and coding scheme (MCS) of the ranging request message using a maximum size of the ranging request message and the allocation size, wherein the maximum size of the ranging request message is determined depending on a purpose of the ranging procedure, wherein the stein of determining the MCS comprises:
        selecting a first index mapped to the maximum size of the ranging request message and a second index mapped to the allocation size and
        determining the MCS using a third index obtaining by subtracting the second index from the first index, and
    transmit the determined MCS applied ranging request message to the base station, wherein the purpose of the ranging procedure comprises a handover process or an initial network entry,
wherein the first index is selected from Table A, shown below, using the size of the request message:

TABLE A

| idx | $N_{DB}$ (byte) | $K_{FB}$ |
|---|---|---|
| 1 | 6 | 1 |
| 2 | 8 | 1 |
| 3 | 9 | 1 |
| 4 | 10 | 1 |
| 5 | 11 | 1 |
| 6 | 12 | 1 |
| 7 | 13 | 1 |

TABLE A-continued

| idx | $N_{DB}$ (byte) | $K_{FB}$ |
|---|---|---|
| 8 | 15 | 1 |
| 9 | 17 | 1 |
| 10 | 19 | 1 |
| 11 | 22 | 1 |
| 12 | 25 | 1 |
| 13 | 27 | 1 |
| 14 | 31 | 1 |
| 15 | 36 | 1 |
| 16 | 40 | 1 |
| 17 | 44 | 1 |
| 18 | 50 | 1 |
| 19 | 57 | 1 |
| 20 | 64 | 1 |
| 21 | 71 | 1 |
| 22 | 80 | 1 |
| 23 | 90 | 1 |
| 24 | 100 | 1 |
| 25 | 114 | 1 |
| 26 | 128 | 1 |
| 27 | 144 | 1 |
| 28 | 164 | 1 |
| 29 | 180 | 1 |
| 30 | 204 | 1 |
| 31 | 232 | 1 |
| 32 | 264 | 1 |
| 33 | 296 | 1 |
| 34 | 328 | 1 |
| 35 | 368 | 1 |
| 36 | 416 | 1 |
| 37 | 472 | 1 |
| 38 | 528 | 1 |
| 39 | 600 | 1 |
| 40 | 656 | 2 |
| 41 | 736 | 2 |
| 42 | 832 | 2 |
| 43 | 944 | 2 |
| 44 | 1056 | 2 |
| 45 | 1200 | 2 |
| 46 | 1416 | 3 |
| 47 | 1584 | 3 |
| 48 | 1800 | 3 |
| 49 | 1888 | 4 |
| 50 | 2112 | 4 |
| 51 | 2400 | 4 |
| 52 | 2640 | 5 |
| 53 | 3000 | 5 |
| 54 | 3600 | 6 |
| 55 | 4200 | 7 |
| 56 | 4800 | 8 |
| 57 | 5400 | 9 |
| 58 | 6000 | 10 |
| 59 | 6600 | 11 |
| 60 | 7200 | 12 |
| 61 | 7800 | 13 |
| 62 | 8400 | 14 |
| 63 | 9600 | 16 |
| 64 | 10800 | 18 |
| 65 | 12000 | 20 |
| 66 | 14400 | 24 | and wherein "idx" represents the first index and "$N_{DB}$" the maximum size of the ranging request message.

6. The mobile terminal of claim 5, wherein if the purpose of the ranging procedure is the handover process, the maximum size of the ranging request message is eight bytes, and wherein if the purpose of the ranging procedure is the initial network entry, the maximum size of the ranging request message is 15 bytes.

7. The mobile terminal of claim 5, wherein the second index is selected from Table B, shown below, using the allocation size received from the BS and the MCS is determined using Table C, shown below, using the third index:

TABLE B

| Allocation size | $I_{MinimalSize}$ |
|---|---|
| 1~3 | 1 |
| 4 | 2 |
| 5 | 4 |
| 6 | 6 |
| 7 | 8 |
| 8 | 9 |
| 9 | 10 |
| 10~11 | 11 |
| 12 | 12 |
| 13 | 13 |
| 14~15 | 14 |
| 16~18 | 15 |
| 19~20 | 16 |
| 21~22 | 17 |
| 23~25 | 18 |
| 26~28 | 19 |
| 29~32 | 20 |
| 33~35 | 21 |
| 36~40 | 22 |
| 41~45 | 23 |
| 46~50 | 24 |
| 51~57 | 25 |
| 58~64 | 26 |
| 65~72 | 27 |
| 73~82 | 28 |
| 83~90 | 29 |
| 91~102 | 30 |
| 103~116 | 31 |
| 117~131 | 32 |
| 132~145 | 33 |
| 146~164 | 34 |
| 165~184 | 35 |
| 185~192 | 36 |

TABLE C

| $I_{SizeOffset}$ | $N_{mod}$ (allocation size > 2) | $N_{mod}$ (allocation size = 2) | $N_{mod}$ (allocation size = 1) |
|---|---|---|---|
| 0~9 | 2 | 2 | 2 |
| 10~15 | 2 | 2 | 4 |
| 16~18 | 2 | 4 | 6 |
| 19~21 | 4 | 4 | 6 |
| 22~23 | 4 | 6 | 6 |
| 24~31 | 6 | 6 | 6 | wherein "$I_{MinimalSize}$" represents the second index, "$I_{SizeOffset}$" represents the third index and "$N_{mod}$" represents a modulation order according to the MCS.

8. The mobile terminal of claim 5, wherein the processor controls the allocation size to be obtained through one of a super frame header, a prescribed medium access control message and a MAP information element.

* * * * *